(12) United States Patent
Guillot et al.

(10) Patent No.: US 10,554,423 B2
(45) Date of Patent: Feb. 4, 2020

(54) DEVICE FOR CONNECTING TWO APPARATUSES VIA AN ETHERNET LINK, AND DOCKING STATION FOR ONE OF SAID APPARATUSES

(75) Inventors: François Guillot, Paris (FR); Nicolas Domblides, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 330 days.

(21) Appl. No.: 13/514,546

(22) PCT Filed: Dec. 15, 2010

(86) PCT No.: PCT/EP2010/007645
§ 371 (c)(1),
(2), (4) Date: Jun. 7, 2012

(87) PCT Pub. No.: WO2011/072842
PCT Pub. Date: Jun. 23, 2011

(65) Prior Publication Data
US 2012/0246496 A1    Sep. 27, 2012

(30) Foreign Application Priority Data
Dec. 16, 2009  (FR) ...................................... 09 59045

(51) Int. Cl.
*G06F 1/26* (2006.01)
*H02J 3/00* (2006.01)
(Continued)

(52) U.S. Cl.
CPC ................ *H04L 12/10* (2013.01); *G06F 1/26* (2013.01); *G06F 13/00* (2013.01); *G06F 13/40* (2013.01); *G06F 13/4045* (2013.01); *H02J 3/00* (2013.01)

(58) Field of Classification Search
None
See application file for complete search history.

(56) References Cited

U.S. PATENT DOCUMENTS

| 7,915,755 B2* | 3/2011 | Diab ....................... H04L 12/10 307/17 |
| 2005/0068700 A1* | 3/2005 | Guillot ........................... 361/18 |

(Continued)

OTHER PUBLICATIONS

G. Mendelson "All You Need to Know About Power over Ethernet (PoE) and the IEEE 802.3af Standard", URL: http://www.powerdsine.com/Documentation/WhitePapers/PoE_and_IEEE802_3 af.pdf, Jun. 30, 2004, 24 pages.

*Primary Examiner* — Tanh Q Nguyen
(74) *Attorney, Agent, or Firm* — Muncy, Geissler, Olds & Lowe, P.C.

(57) ABSTRACT

A connection device for connecting a piece of master electronic equipment to a piece of peripheral electronic equipment, each being provided with a respective external connection port of a first type, the device comprising a master connection unit and a peripheral connection unit, each of which is provided with an external connection port of the first type for connecting to the corresponding piece of equipment, and which are connected to each other via electrical isolation using a link of a second type, namely of the Ethernet type, having a transmit line and a receive line, each unit including a first type/Ethernet interface connected to said lines and a power supply module mounted in common mode between the transmit and receive lines in order to transmit or receive AC over the link. A docking station for peripheral equipment including such a device.

5 Claims, 2 Drawing Sheets

(51) Int. Cl.
*G06F 13/00* (2006.01)
*G06F 13/40* (2006.01)
*H04L 12/10* (2006.01)

(56) References Cited

U.S. PATENT DOCUMENTS

| | | | |
|---|---|---|---|
| 2005/0078700 A1* | 4/2005 | Thompson et al. | 370/463 |
| 2005/0278472 A1 | 12/2005 | Gierke | |
| 2006/0215431 A1* | 9/2006 | Ely et al. | 363/131 |
| 2009/0196621 A1* | 8/2009 | Chen | 398/115 |
| 2012/0246496 A1* | 9/2012 | Guillot et al. | 713/300 |

* cited by examiner

DEVICE FOR CONNECTING TWO APPARATUSES VIA AN ETHERNET LINK, AND DOCKING STATION FOR ONE OF SAID APPARATUSES

BACKGROUND OF THE INVENTION

Field of the Invention

The present invention relates to a device for connecting two pieces of equipment together. By way of example, one of the pieces of equipment is a computer unit and the other is an input peripheral such as a keyboard, a pointer device of the mouse or touchpad type, or a mass data storage peripheral such as an external hard disk or a solid state memory. The invention also provides a docking station for such a piece of equipment.

Brief Discussion of the Related Art

Computer systems are generally built around a computer unit, commonly referred to as a central unit, with peripherals that are connected thereto. The computer unit incorporates one or more processors, and memories storing an operating system and applications that are executed by the processor (s). The peripherals are connected to the computer unit by parallel or serial links. Serial links that make use more particularly of a universal serial bus (USB) type protocol have become widespread in computer systems, both for consumers and in industry. That type of link is also suitable for use in connecting peripherals to one another.

Nevertheless, that type of serial link presents a certain number of drawbacks that make such links difficult to use in certain highly constrained applications, in particular concerning electrostatic discharge.

Amongst those drawbacks, there is the absence of electrical isolation that can be extremely harmful for the elements that are connected together thereby when lightning strikes the electrical insulation to which one of the elements is connected.

This risk is all the greater in modern aircraft where the fuselage is less and less capable of acting as a Faraday cage because of the increasing use of composite materials to make fuselages, where such materials are poor conductors. This makes it necessary to have recourse to non-linear components of the spark gap, lightning diode, or varistor type. The electrical levels that need to be withstood are relatively great (1500 volts (V) and 500 amps (A) for a period of 100 microseconds ($\mu$s)), so such components are designed to be highly stressed. By way of example, a component capable of limiting a signal to 54 V must be capable of absorbing 40 kilowatts (kW) for 100 $\mu$s with a temperature de-rating of 60%. As a result, such components are very bulky and give rise to large amounts of stray capacitance, leading to problems of rapid signal attenuation. Furthermore, the circuits that make use of such components can be tested only by using tooling that is expensive and not without danger both for the components of the circuit and for the operators of such tooling.

In addition, the low conductivity of composite materials prevents the use of a hardware ground as a reference in terms of electromagnetic compatibility, at least for low frequency components. The maximum coupling capacitance to hardware ground is also limited to 150 nanofarads (nF), or even much less, since it may be less than 100 picofarads (pF).

Furthermore, that type of link presents other drawbacks when used in computer systems on board aircraft:

linking is possible over a short distance only even though computer systems may be split up on board aircraft in order to optimize utilization of the space available, such that the various elements of an on-board computer system are often remote from one another; and a lack of feedback based on experience concerning links of this type in aviation applications.

As a result, in such applications, the power supply and communications functions are kept separate.

All or some of the above-mentioned drawbacks are also present with various links of other types and in particular of the following types: PS2, ARINC 429, CAN bus, . . . , regardless of the intended application.

SUMMARY OF THE INVENTION

An object of the invention is to provide link means between pieces of electronic equipment, which means present the above-mentioned drawbacks little or not at all.

To this end, the invention provides a connection device for connecting a piece of master electronic equipment to a piece of peripheral electronic equipment, each being provided with a respective external connection port of a first type, the device comprising a master connection unit and a peripheral connection unit, each of which is provided with an external connection port of the first type for connecting to the corresponding piece of equipment, and which are connected to each other via electrical isolation using a link of a second type, namely of the Ethernet type, having a transmit line and a receive line, each unit including a first type/Ethernet interface connected to said lines and a power supply module mounted in common mode between the transmit and receive lines in order to transmit or receive AC over the link.

Thus, the device of the invention enables the link of the first type to be replaced by an Ethernet link which is established between the pieces of equipment in order to act in reliable and robust manner to transmit both data signals and power supply current while also ensuring electrical isolation between the pieces of equipment. An Ethernet link also enables communication over distances that are relatively long.

Preferably, the power supply module of the master connection unit includes a regulator member arranged to perform servo-control on a root mean square (rms) voltage value and on a current waveform output by the power supply module.

This makes it possible to optimize the power supply parameters of the peripheral equipment.

Advantageously, the power supply module of the peripheral connection unit includes a diode bridge and a capacitor.

Rectifying the AC by means of a diode bridge and a capacitor presents the advantage of being simple, reliable, and inexpensive.

The invention also provides a docking station for a piece of peripheral equipment, the docking station comprising a housing for receiving the peripheral connection unit of a connection device of the type provided by the invention.

BRIEF DESCRIPTION OF THE DRAWINGS

Other characteristics and advantages of the invention appear on reading the following description of particular, non-limiting embodiments of the invention.

Reference is made to the accompanying drawings, in which.

DETAILED DESCRIPTION OF THE PREFERRED EMBODIMENTS

Figure 1:
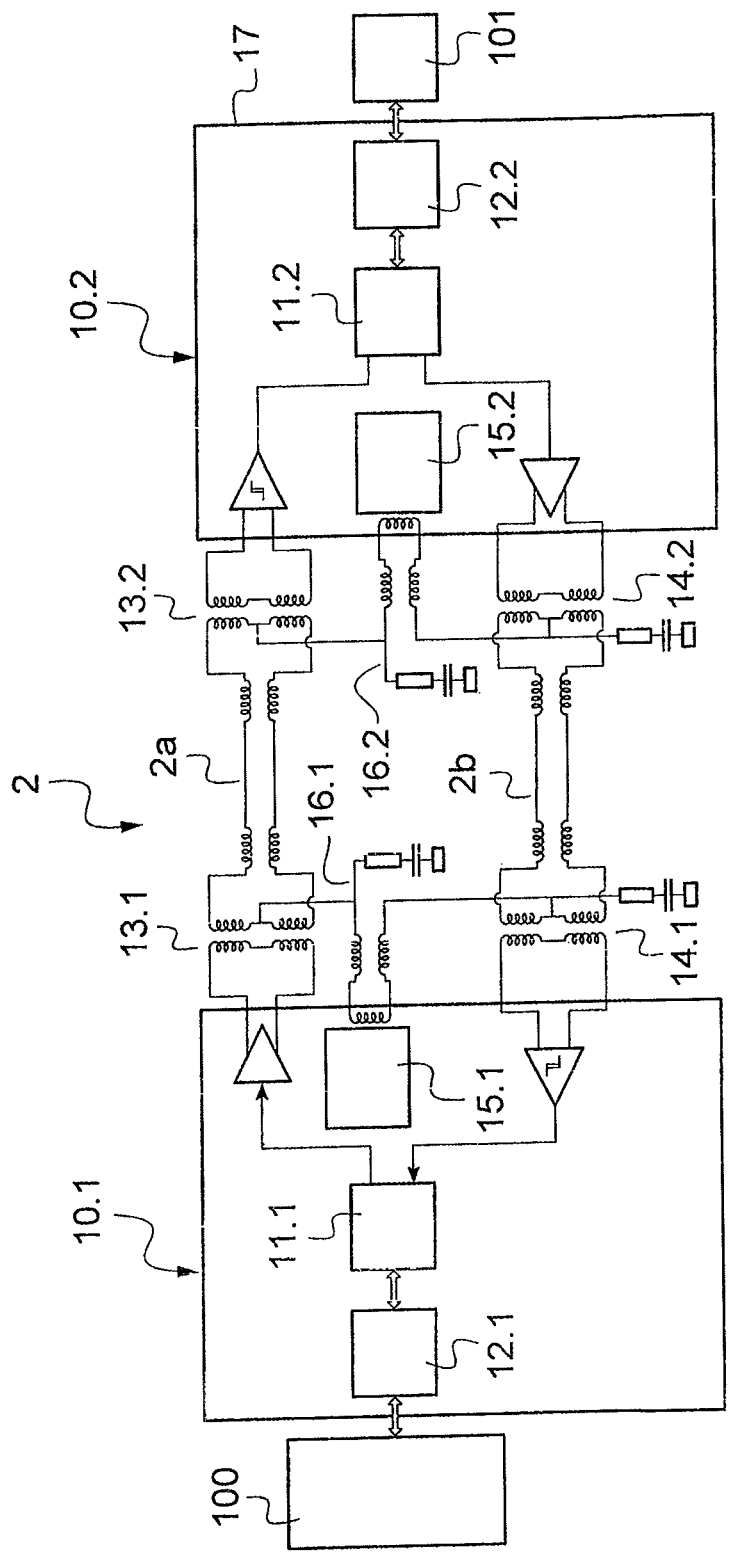
FIG. 1 is a schematic of the circuit of the device in accordance with the invention.
Figure 2:
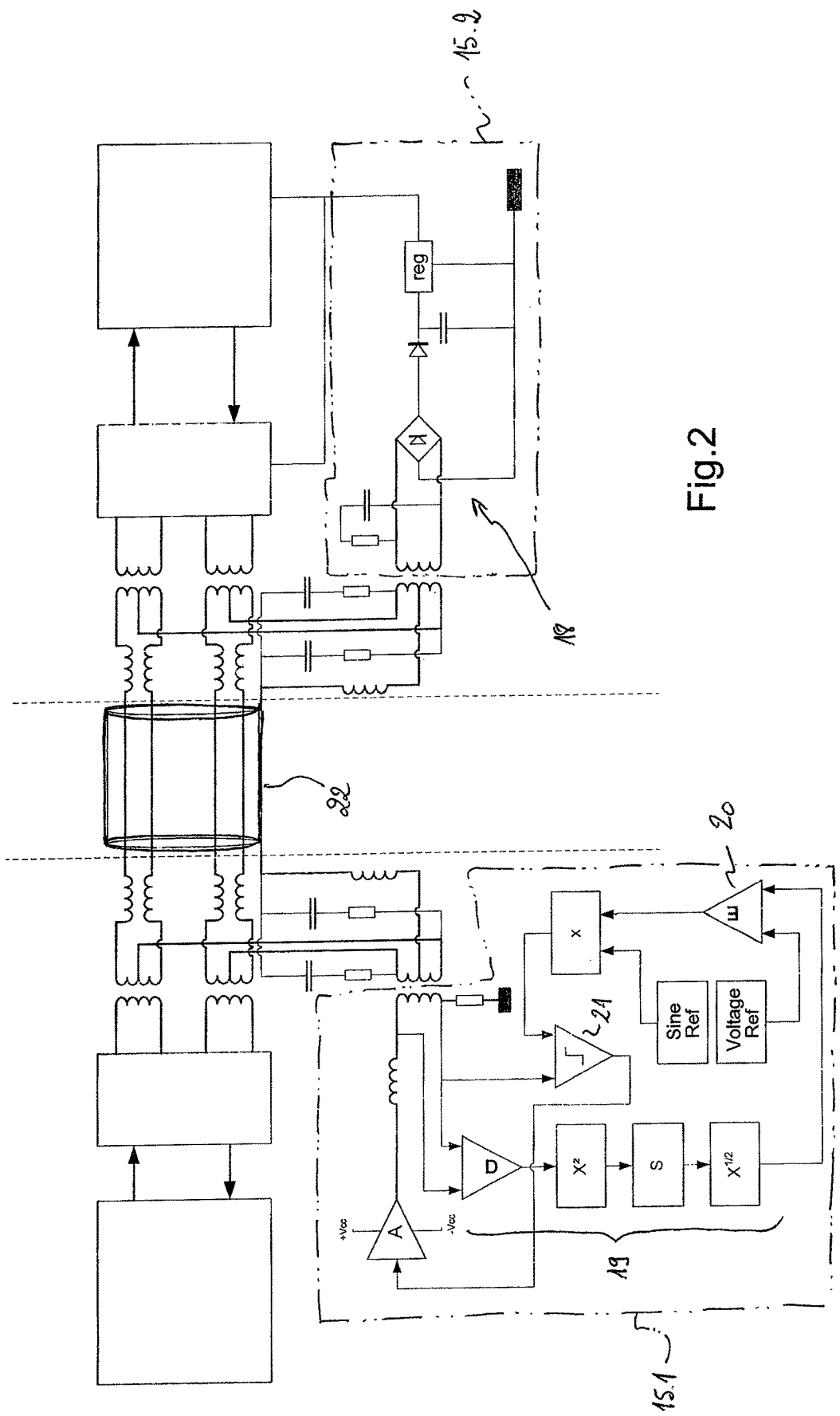
FIG. 2 is a diagram showing symbolically and more particularly the power supply modules.

With reference to the figures, the connection device in accordance with the invention is for enabling a master piece of electronic equipment, here the central unit 100 of a computer system, to be connected to a peripheral piece of electronic equipment, here a member for inputting data into the central unit, specifically a keyboard 101. Nevertheless, the invention can be used by any type of equipment such as a mouse or touchpad pointer, a mass memory such as a hard disk or a solid state memory of the Flash type, a printer, . . . .

The central unit 100 and the input member 101 are both provided with an external connection port of a first type, here of the USB type.

The connection device of the invention, given overall reference 1, comprises a master connection unit 10.1 and a peripheral connection unit 10.2 that are connected together by a link 2 of a second type, specifically the Ethernet type, comprising a transmit line 2a and a receive line 2b. The transmit line 2a and the receive line 2b are each made up of a pair of conductors in an Ethernet cable 22, here a cable of the Quadrax type.

The master connection unit 10.1 has a USB/Ethernet interface 11.1 that possesses an external USB connection port 12.1 for connection to the central unit 100 and that is connected to the transmit line 2a and to the receive line 2b via respective isolating transformers 13.1 and 14.1.

The master connection unit 10.1 also includes a power supply module 15.1 mounted in common mode between the transmit line 2a and the receive line 2b in order to transmit, via electrical isolation, alternating current over the link. Electrical isolation is provided by an isolating transformer 16.1 having its secondary connected to the midpoint of the secondary of the transformer 13.1 and to the primary of the transformer 14.1.

The power supply module 15.1 is arranged to supply electricity at a frequency that is low enough to avoid disturbing communications, and high enough to limit the size of the transformer 16.1. The recommended frequency range in this example is 2 kilohertz (kHz) to 100 kHz, or 2 kHz to 10 kHz. The transformer in this example is preferably arranged to provide electrical isolation (DC, low frequency AC, and high frequencies) in excess of 1500 V.

The power supply module 15.1 thus comprises an isolated DC/AC converter serving to transmit power over the link 2 and that is associated with regulator member. The regulator member is arranged to perform servo-control on an rms voltage and servo-control on a (sinusoidal) waveform of the current at the outlet from the power supply module 15.2. The waveform servo-control is implemented to limit any risk of electromagnetic disturbance. This makes it possible to avoid power supply faults such as switching noise (glitches) that the input member 101 might not be capable of withstanding and that would make it necessary to provide bulky filtering elements at the peripheral connection unit 10.2.

The peripheral connection unit 10.2 also comprises a power supply module 15.2 mounted in common mode between the transmit line 2a and the receive line 2b so as to receive, via electrical isolation, AC over the link. The electrical isolation is provided by an isolating transformer 16.2 having its primary connected to the midpoint of the primary of the transformer 13.2 and to the secondary of the transformer 14.2. The power supply module 15.2 is isolated and thus serves to transmit power over the link 2.

The power supply module 15.2 of the peripheral connection unit has a rectifier circuit given overall reference 18 that comprises a diode bridge and a capacitor.

In this example, the connection unit 10.2 is contained in a housing 17 of a docking station arranged to receive the keyboard 101. The USB external connection port 12.2 leads to the outside of the housing 21 in order to enable the keyboard 101 to be connected to the USB/Ethernet interface 11.2 of the connection unit 10.2.

The USB/Ethernet interface 11.2 may have a plurality of external connection ports so as to act as a hub and so as to enable a plurality of peripherals to be connected.

In this example, standard Ethernet 100 base T interfaces are used between the connection modules.

The device of the invention enables a power supply voltage to be transmitted as an alternating signal in common mode on the transmit line and the receive line (V+ is transmitted over one of the pairs of the Ethernet cable 22 and V− is transmitted over the other pair). In an aviation application, it is considered that the maximum transmissible power is 30 volt-amps (VA) (28 V. and at least one 1 $A_{rms}$ in the range 10 kHz to 100 kHz). The power supply signal is regulated using two parameters: the rms voltage and the waveform of the current. At the source, the rms voltage is measured (circuit 19) and the generator is servo-controlled (servo-control member 20) to deliver a predetermined voltage, e.g. 28 V, regardless of the current waveform. Furthermore, servo-control is also performed on the current waveform (servo-control member 21). More specifically, this is servo-control to obtain a sinewave, as mentioned above. This serves to simplify the receiver portion by limiting electromagnetic disturbances. In particular, switching noise due to the diodes of the diode bridge in the rectifier circuit 18 is limited or even eliminated without adding recourse to bulky filter elements. The frequency selected for the signal, here preferably lying in the range 2 kHz to 100 kHz, is low enough to avoid disturbing communications and high enough to minimize the size of the transformer.

For DC, isolation is provided by the transformers, and for AC, capacitive coupling is minimized because of the presence of front-mounted transformers. Capacitive coupling is low in the coupling transformers and it is possible to add common mode inductors in series on each line 2a, 2b in order to compensate for the drop in the impedance of the capacitive coupling at high frequency.

The invention makes it possible to limit the number of inputs/outputs of pieces of equipment.

In a particular embodiment, the master electronic equipment and the peripheral electronic equipment are both computers or computer units. Thus, the computer of the peripheral electronic equipment is powered by the master electronic equipment. As a result, only the master electronic equipment needs to have a power supply, thereby lightening the structure of the computer system and simplifying maintenance.

It should be observed that conventional solutions for transmitting power over an Ethernet link procure insufficient isolation for high frequency AC since they make use of conventional DC/DC converters interfaced with the electronic functions of the connected equipment, which converters exhibit large amounts of capacitive coupling enabling high frequency currents to flow.

Naturally, the invention is not limited to the embodiments described but covers any variant coming within the ambit of the invention as defined by the claims.

In particular, the external connection ports may be of any type, e.g. USB, PS2, ARINC 429, CAN bus, . . . .

The power supply module 15.2 may be a digital module and may include a power factor correction (PFC) device.

One or more connection units may include a plurality of USB ports.

What is claimed is:

1. A connection device for connecting a piece of master electronic equipment to a piece of peripheral electronic equipment, each being provided with a respective external connection port of a first type, the device comprising:
   a master connection unit; and
   a peripheral connection unit,
   wherein each of the master connection unit and the peripheral connection unit is provided with an external connection port of the first type for connecting to the corresponding piece of equipment, and which are connected to each other via electrical isolation using a link of a second type, the second type being an Ethernet type, having a transmit line and a receive line, the transmit line being connected to the master connection unit by a first isolating transformer, the transmit line being connected to the peripheral connection unit by a second isolating transformer, the receive line being connected to the master connection unit by a third isolating transformer, and the receive line being connected to the peripheral connection unit by a fourth isolating transformer,
   wherein the master connection unit comprises:
      a first type/Ethernet interface connected to said lines; and
      a power supply module mounted in common mode between the transmit and receive lines in order to transmit alternating current over the link, the link further including:
         a fifth isolating transformer having its secondary connected to the midpoint of the secondary of the first isolation transformer and to the primary of the third isolating transformer; and
         a sixth isolating transformer having its primary connected to the midpoint of the primary of the second isolation transformer and to the secondary of the fourth isolating transformer, and
   wherein the peripheral connection unit comprises:
      a first type/Ethernet interface connected to said lines; and
      a power supply module mounted in common mode between the transmit and receive lines in order to receive the alternating current.

2. The device according to claim 1, wherein the power supply module of the master connection unit includes a DC/AC converter.

3. The device according to claim 2, wherein the power supply module of the peripheral connection unit includes a diode bridge and a capacitor.

4. The device according to claim 1, wherein at least one of the peripheral connection unit and the master connection unit includes a plurality of USB ports.

5. A system comprising a piece of master electronic equipment and a piece of peripheral electronic equipment and a docking station for the piece of peripheral electronic equipment, the piece of master electronic equipment and the piece of peripheral electronic equipment being provided with a respective external connection port of a first type, the docking station comprising a housing containing a peripheral connection unit of a connection device, the connection device comprising:
   a master connection unit; and
   the peripheral connection unit,
   wherein each of the master connection unit and the peripheral connection unit is provided with an external connection port of the first type for connecting to the corresponding piece of equipment, and which are connected to each other via electrical isolation using a link of a second type, the second type being an Ethernet type, having a transmit line and a receive line, the transmit line being connected to the master connection unit by a first isolating transformer, the transmit line being connected to the peripheral connection unit by a second isolating transformer, the receive line being connected to the master connection unit by a third isolating transformer, and the receive line being connected to the peripheral connection unit by a fourth isolating transformer,
   wherein the master connection unit comprises:
      a first type/Ethernet interface connected to said lines; and
      a power supply module mounted in common mode between the transmit and receive lines in order to transmit alternating current over the link, the link further including:
         a fifth isolating transformer having its secondary connected to the midpoint of the secondary of the first isolation transformer and to the primary of the third isolating transformer; and
         a sixth isolating transformer having its primary connected to the midpoint of the primary of the second isolation transformer and to the secondary of the fourth isolating transformer, and
   wherein the peripheral connection unit comprises:
   a first type/Ethernet interface connected to said lines; and
   a power supply module mounted in common mode between the transmit and receive lines in order to receive the alternating current.

* * * * *